Figure 4:
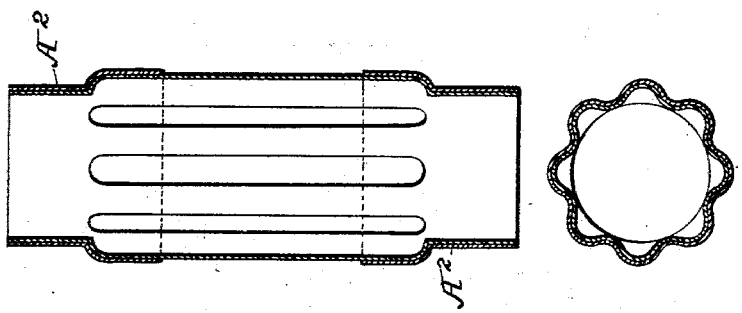

No. 629,245. Patented July 18, 1899.
S. FRANK.
APPARATUS FOR PRODUCING RIBBED OR CORRUGATED TUBES.
(Application filed July 21, 1898.)
(No Model.) 5 Sheets—Sheet 1.

Witnesses
Inventor
Salomon Frank
by Foster & Freeman
Attorneys

No. 629,245. Patented July 18, 1899.
S. FRANK.
APPARATUS FOR PRODUCING RIBBED OR CORRUGATED TUBES.
(Application filed July 21, 1898.)
(No Model.) 5 Sheets—Sheet 2.
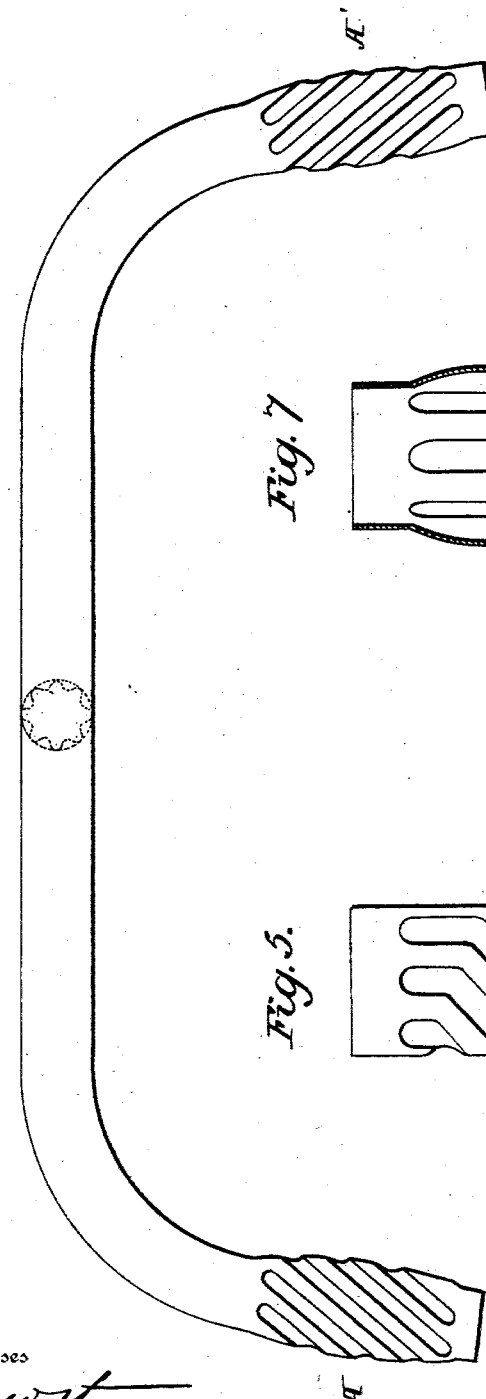
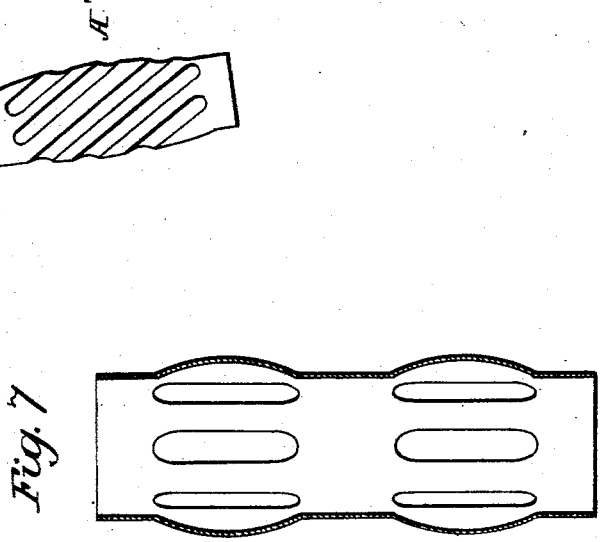
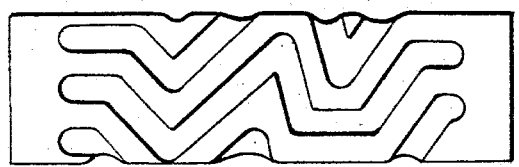

No. 629,245. Patented July 18, 1899.
S. FRANK.
APPARATUS FOR PRODUCING RIBBED OR CORRUGATED TUBES.
(Application filed July 21, 1898.)
(No Model.) 5 Sheets—Sheet 3.
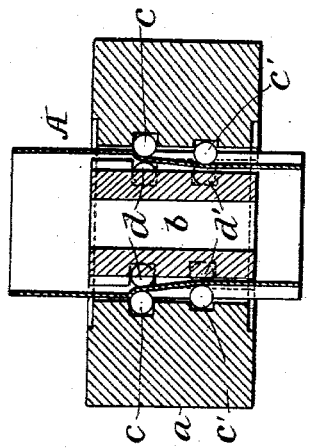
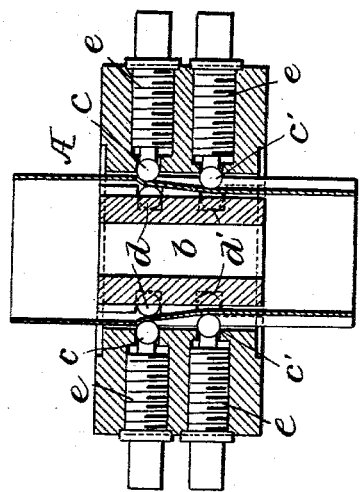
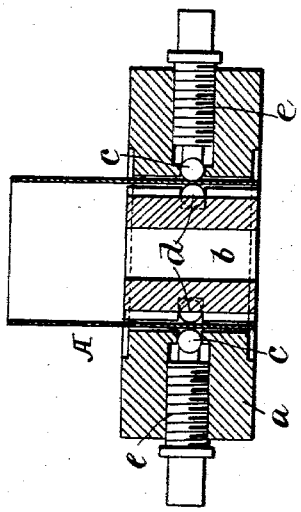
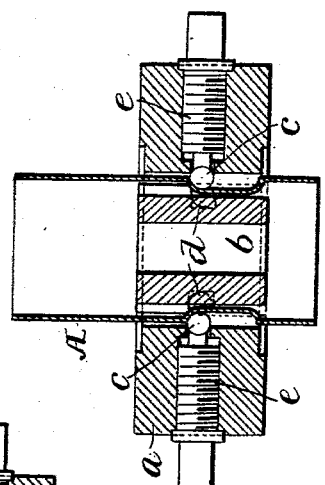
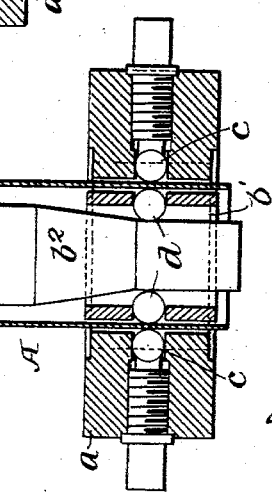

No. 629,245. Patented July 18, 1899.
S. FRANK.
APPARATUS FOR PRODUCING RIBBED OR CORRUGATED TUBES.
(Application filed July 21, 1898.)
(No Model.) 5 Sheets—Sheet 4.
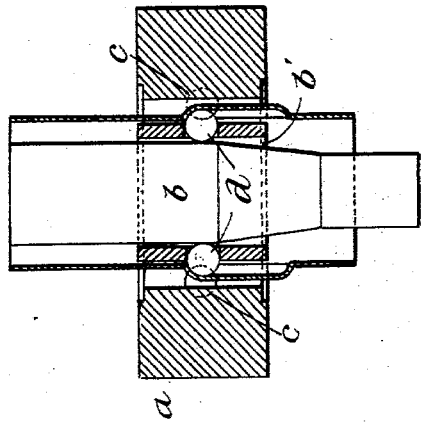
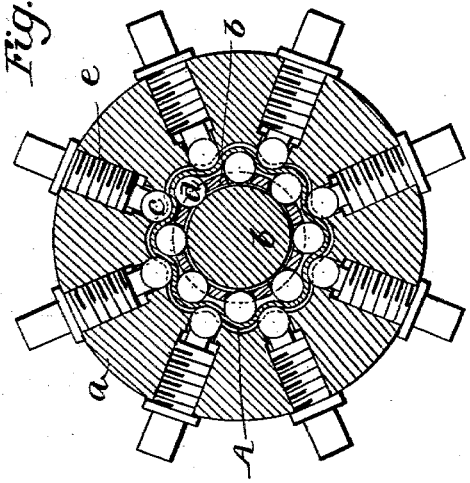
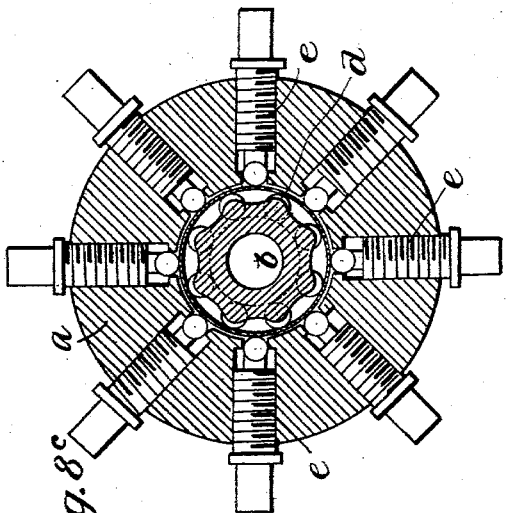
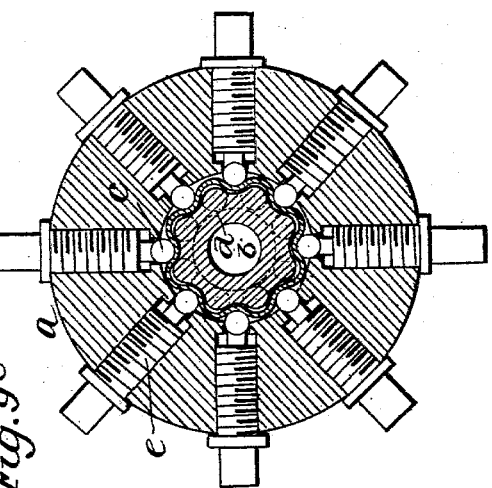
Witnesses
Inventor
Salomon Frank
by Foster & Freeman
Attorneys
THE NORRIS PETERS CO., PHOTO-LITHO., WASHINGTON, D. C.

No. 629,245. Patented July 18, 1899.
S. FRANK.
APPARATUS FOR PRODUCING RIBBED OR CORRUGATED TUBES.
(Application filed July 21, 1898.)
(No Model.) 5 Sheets—Sheet 5.
Fig. 11.
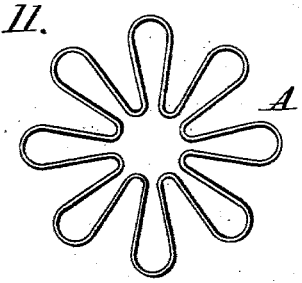
Fig. 11a.
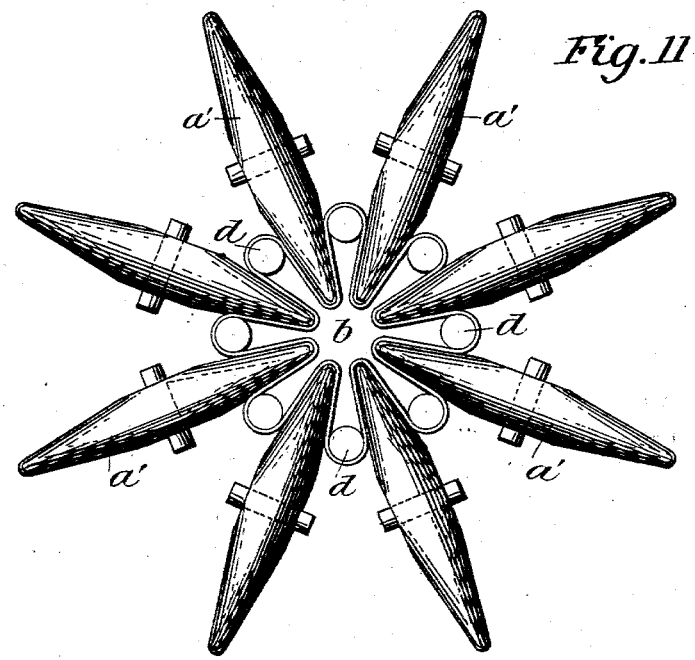
Fig. 11b. Fig. 11c.
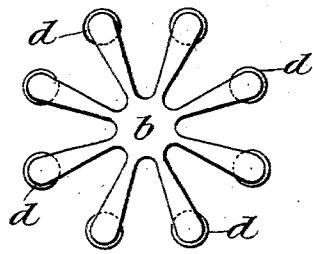 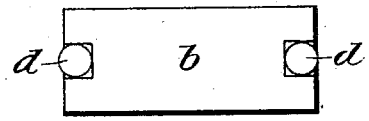
Witnesses
Inventor
Salomon Frank
by Foster & Freeman
Attorneys

UNITED STATES PATENT OFFICE.

SALOMON FRANK, OF FRANKFORT-ON-THE-MAIN, GERMANY.

APPARATUS FOR PRODUCING RIBBED OR CORRUGATED TUBES.

SPECIFICATION forming part of Letters Patent No. 629,245, dated July 18, 1899.

Application filed July 21, 1898. Serial No. 686,504. (No model.)

*To all whom it may concern:*

Be it known that I, SALOMON FRANK, a subject of the Queen of England, and a resident of Frankfort-on-the-Main, Germany, have invented certain new and useful Improvements in Apparatus for the Production of Ribbed or Corrugated Tubes, of which the following is a specification.

My invention relates to means by which tubes can be provided with straight, longitudinal, angular, or spiral ribs or corrugations extending over the whole or part of the tube.

In the accompanying drawings, Figures 1 to 4 are longitudinal and transverse sections of variously-corrugated tubes made in accordance with my invention. Fig. 5 is an exterior view of a modification. Fig. 6 is a plan view of a cycle handle-bar with corrugated end portions or grips. Fig. 7 is a longitudinal section of a tube with another form of ribs or corrugations. Figs. 8$^a$ and 8$^b$ are vertical central sections of the improved apparatus used in corrugating the tubes, and Fig. 8$^c$ is a horizontal section thereof. Figs. 9$^a$ and 9$^b$ are vertical central sections of a different form of the apparatus, and Fig. 9$^c$ is a horizontal section thereof. Figs. 10$^a$ and 10$^b$ are vertical central sections of another form of the apparatus, and Fig. 10$^c$ is a horizontal section thereof. Fig. 11 is a cross-section of another form of corrugated tube. Fig. 11$^a$ is a plan view of the apparatus used in making the latter tube. Fig. 11$^b$ is a plan view of the mandrel of Fig. 11$^a$, and Fig. 11$^c$ is a detail thereof.

According to this invention the tube to be ribbed or corrugated is forced along between a matrix and a mandrel, in which balls are arranged at each side of the tube to produce the desired shape, as hereinafter described.

Figure 1:
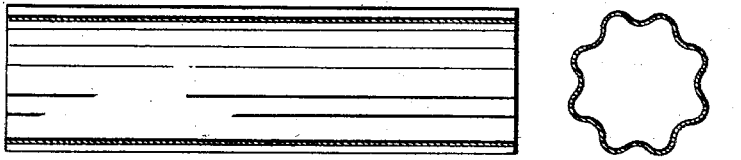

In cases where the tubes are to be longitudinally ribbed throughout their length, as represented in longitudinal and transverse sections in Fig. 1, the device shown in Figs. 9$^a$, 9$^b$, and 9$^c$ is employed. This device consists of an exterior matrix $a$ and an interior mandrel $b$. In the matrix $a$ two circular superposed rows or annular series of balls $c\ c'$ are arranged. Behind these balls screws $e$ are provided, by means of which the balls can be forced out to a greater or less extent, as required. The mandrel $b$ is furnished with similarly-arranged balls $d\ d'$.

The method of corrugating a tube is as follows: The mandrel $b$ is inserted concentrically into the matrix in such a manner that the balls $d\ d'$ in the matrix are situated in the same horizontal planes as the balls $c\ c'$ in the mandrel; but the balls in the matrix are situated opposite the spaces between the balls in the mandrel, as shown in Fig. 9$^c$. The screws $e$ are turned so as to force one series $c'$ of the balls in the matrix slightly farther toward the center than the other series of balls $c$. The mandrel $b$ is so shaped that the balls $d$ and $d'$ will project according to the inner diameter of the tubes. If, now, the tube A be forced along between the matrix and the mandrel, the balls $c\ c'$ of the matrix will press the metal of the tube inward, during which operation the balls $d\ d'$ of the mandrel act as abutments. The balls $c$ of the matrix and the balls $d$ of the mandrel serve as the preliminary and the balls $c'\ d'$ as the finishing balls.

Figure 2:
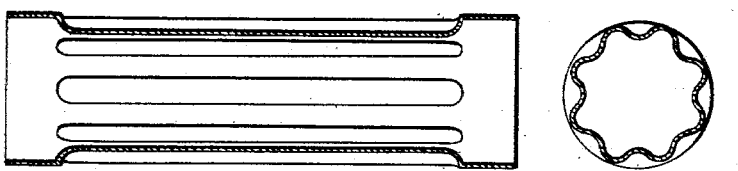

For producing ribs which do not extend throughout the length of the tube, as illustrated in Fig. 2, the device shown in Figs. 8$^a$, 8$^b$, and 8$^c$ is employed. In this device the matrix $a$ and the mandrel $b$ are each furnished with only one annular series or row of balls $c$ and $d$, respectively. In commencing the operation the screws $e$ of the matrix are so adjusted that the balls $c$ allow the tube to be inserted, so that the part where the ribs or corrugations are to be commenced is between the series of balls $c$ in the matrix and the balls $d$ in the mandrel, Fig. 8$^a$. The screws $e$ are then so turned that the balls $c$ press inward the wall of the tube, thus producing inwardly-projecting bulges thereon. Thereupon the tube A is drawn along between the matrix and the mandrel to an extent corresponding to the length of the ribs to be made on the said tube, and finally the screws $e$ are turned outward to admit of the tube being withdrawn. If the balls $d$ in the mandrel are required to bulge the wall of the tube outward, so that tubes with outwardly-projecting ribs or corrugations are formed, as shown in Fig.

3, the device shown in Figs. 10ª, 10ᵇ, and 10ᶜ is employed. In this device the matrix $a$ can be like that last described; but the mandrel $b$ is surrounded by a hollow sleeve or cylinder $b'$, having openings therein through which the balls $d$ project, and the mandrel $b$ proper has a conical or tapered part $b^2$. The screws $e$ are so adjusted that the balls $c$ allow tube A to be inserted between the balls $c$ and $d$. The mandrel $b$ proper is concentrically inserted into the tube A and so connected with it as to be compelled to participate in the movement thereof along the matrix. When the tube has been inserted to requisite extent, the conical portion $b^2$ of the mandrel comes into contact with the balls $d$ in the sleeve and forces these balls outward, so that outwardly-projecting ribs are formed upon the tube A. The balls $c$ of the matrix in this case serve as abutments.

Zigzag ribs or corrugations, as represented in Fig. 5, can be formed by turning the tube axially to and fro while it is being moved longitudinally in the matrix.

Spiral or helical ribs or corrugations can be formed if the tube receives a rotary movement in one direction while it is being moved longitudinally in the matrix.

By properly shaping the mandrel $b$ non-continuous ribs may be formed on the tube, as shown in Fig. 7.

Figure 3:
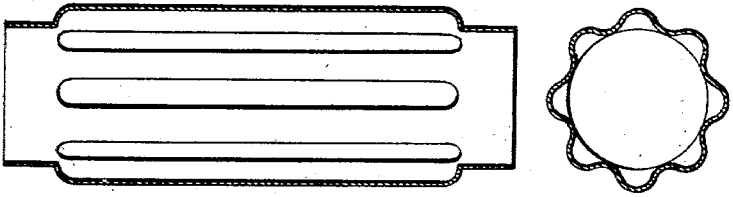

Tubes made with ribs or corrugations extending only partly throughout their length, as illustrated in Figs. 2 and 3 of the drawings, are especially suitable for seat-pillars and handle-bars of velocipedes, as such seat-pillars and handle-bars are inserted into their correspondingly-shaped sockets, in which they are thus prevented from displacement relatively to said sockets.

The form of tube shown by Fig. 3 is suitable to be employed in the construction of frames with the object of increasing the resistance, and for this purpose the ends may be reinforced by strengthening-sleeves $A^2$, as represented in Fig. 4.

When it is desired to construct very deep grooves or corrugations in tubes, as shown, for example, in Fig. 11, the mandrel $b$ should be shaped to correspond to the internal sectional shape of the tube to be formed, and instead of providing the matrix with balls $c$, as hereinbefore described, the said matrix is provided with or substituted by wheels or disks $a'$, as shown in Fig. 11ª, of suitable shape to press inward the metal of the tube between the projections on the mandrel.

Figs. 11ᵇ and 11ᶜ are detached views of the mandrel, the projections of which carry rollers $d$ at their ends, which bear on the interior surface of the tube.

Having now particularly described and ascertained the nature of this invention and in what manner the same is to be performed, I declare that what I claim is—

1. In apparatus for the manufacture of ribbed or corrugated tubes the combination of a matrix and a mandrel between which the tubes to be ribbed or corrugated are caused to move; balls carried by the matrix and the mandrel and caused to press respectively on exterior and interior surfaces of the tube while the said tube is moving between the matrix and the mandrel substantially as and for the purpose hereinbefore described.

2. In apparatus for the production or manufacture of ribbed or corrugated tubes the combination of a matrix and a mandrel between which the tube to be ribbed or corrugated is caused to move; balls carried by the matrix and the mandrel bearing respectively on the exterior surface and the interior surface of the tube and screws acting on the balls carried by the matrix so as to press the metal of the tube into the spaces between the balls carried by the mandrel so as to form corrugations or ribs on the tube substantially as hereinbefore described.

3. In apparatus for the production or manufacture of ribbed or corrugated tubes the combination of a matrix and a mandrel between which a tube to be ribbed or corrugated is caused to pass; a cylindrical sleeve or ring arranged between the mandrel and the internal surface of the tube, openings in the sleeve or ring and balls placed in the said openings; a conical or taper part on the mandrel for pressing the balls through the openings in the sleeve or ring so as to force the metal of the tube into the spaces between the balls carried by the mandrel substantially as and for the purpose hereinbefore described.

In testimony whereof I have signed my name to this specification in the presence of two subscribing witnesses.

SALOMON FRANK.

Witnesses:
FRANZ HAPLACHER,
MICHAEL VOLKE.